United States Patent [19]

Brandt et al.

[11] Patent Number: 5,695,643
[45] Date of Patent: Dec. 9, 1997

[54] PROCESS FOR BRINE DISPOSAL

[75] Inventors: Harry Brandt, El Macero; John H. Tait, Carmichael, both of Calif.

[73] Assignee: Aquatech Services, Inc., Fair Oaks, Calif.

[21] Appl. No.: 129,692

[22] Filed: Sep. 17, 1993

Related U.S. Application Data

[63] Continuation-in-part of Ser. No. 56,353, Apr. 30, 1993, abandoned.

[51] Int. Cl.$^6$ .................................................. B01D 61/00
[52] U.S. Cl. ................ 210/652; 210/651; 210/180; 210/181; 210/770; 210/684; 203/11; 166/267
[58] Field of Search ........................... 210/651, 652, 210/180, 181, 684, 770, 806, 749, 747, 774; 203/11, 25, 47; 110/346; 159/4.2; 423/46; 432/58; 126/360; 166/267; 175/65, 207

[56] References Cited

U.S. PATENT DOCUMENTS

| | | |
|---|---|---|
| 3,165,452 | 1/1965 | Williams . |
| 3,285,834 | 11/1966 | Guerrieri et al. ............... 203/25 |
| 3,632,505 | 1/1972 | Nelson ........................... 203/11 |
| 3,732,911 | 5/1973 | Lowe et al. . |
| 4,026,760 | 5/1977 | Connally ........................ 159/4 |
| 4,083,781 | 4/1978 | Conger .......................... 210/652 |
| 4,105,556 | 8/1978 | D'Amaddio et al. ............. 210/652 |
| 4,188,291 | 2/1980 | Anderson ....................... 210/652 |
| 4,351,252 | 9/1982 | Shindome et al. ............... 110/346 |
| 4,366,063 | 12/1982 | O'Connor ....................... 210/652 |
| 4,695,248 | 9/1987 | Gray ............................. 432/58 |
| 4,767,498 | 8/1988 | Kreisler ........................ 210/197 |
| 4,882,009 | 11/1989 | Santoleri et al. ............... 159/412 |
| 5,132,090 | 7/1992 | Volland ......................... 422/201 |

OTHER PUBLICATIONS

"Process for Coalbed Brine Disposal", Aquatech Services, Incorporated, Article in Sep. 1992 Issue of The American Oil and Gas Reporter.

"Submerged Combustion Brine Evaporation Process for Coalbed Gas Production" DOE Project Summary, Submitted May 1992.

Primary Examiner—Ana Fortuna
Attorney, Agent, or Firm—Burns, Doane, Swecker & Mathis, L.L.P.

[57] ABSTRACT

A method of treating and disposing of waste water containing salt, such as the brine that results from production of oil and/or gas wells, which includes introducing the waste water into a reverse osmosis unit to produce concentrated brine, and passing the concentrated brine through a combustion heat evaporator wherein said combustion heat is generated in a submerged combustion evaporator or exhaust gases from an internal combustion engine to power a waste heat evaporator to produce a further concentrated brine. The concentrated brine from the combustion heat evaporator can then be mixed with a liquid such as the waste water that is introduced into the reverse osmosis unit. The resulting product can then be injected into a subterranean formation for purposes of disposal. The method allows the volume of the waste water to be significantly reduced while also increasing the salt concentration of the waste water. In other embodiments the reverse osmosis unit and the combustion heat evaporator are used individually. Alternatively, the concentrated brine from the combustion heat evaporator can be introduced into a dryer to evaporate water from the concentrated brine to produce low moisture salt particles.

22 Claims, 4 Drawing Sheets

PROCESS FOR BRINE DISPOSAL

This is a continuation-in-part of Application Ser. No. 08/056,353, filed Apr. 30, 1993, now abandoned.

FIELD OF THE INVENTION

The present invention relates to a method for treating waste water, and more particularly to a method for treating and disposing of waste water such as brine that results from the production of oil and/or gas wells.

BACKGROUND OF THE INVENTION

Various methods have been proposed in the past for treating and disposing of waste water, or contaminated water or brine. Waste water, contaminated water, or brine may be generated in different industries, such as the food processing and electrical power generating industries. One particular area in which such waste water is produced is in the production of oil and gas wells.

Brine is often produced when oil or gas is recovered from subterranean formations. Usually the interstices of oil or gas producing formations contain brine in addition to the oil and/or gas. The pressure gradient created by the production of an oil or gas well causes brine to flow to the well bore in addition to the oil or gas. The brine typically consists of an aqueous solution of several salts such as sodium bicarbonate and sodium chloride. Other salts and chemical constituents may also be present in the brine solution. The chemical composition of a typical brine makes it unfit for human consumption or for irrigation purposes. As a result, an operator of a producing well is usually faced with the problem of having to dispose of significant quantities of brine in an environmentally acceptable manner.

Conventional methods for disposing of brine resulting from the production of oil and/or gas wells involves the use of injection wells. A desirable thickness of the formation into which the brine is to be injected is 200 feet or more. Moreover, the chemical composition of the brine needs to be compatible with formation fluids in order to minimize reduction of injectivity, or plugging or other formation damage. Indeed, even small amounts of colloidal material in the brine, which are often times difficult to isolate with traditional methods, may severely impact formation permeability near the well bore. Permeability loss may require acidizing or fracturing to restore formation permeability.

In light of the foregoing, the cost associated with drilling and installing casing to form injection wells can be quite high—possibly approaching one million dollars. Added to that are the completion and remediation expenses that include formation fracturing and stimulation. Further, there is the cost associated with the injection facilities. The sum total for all of these costs can approach and even exceed 2.5 million dollars.

In addition to the significantly high cost of constructing brine disposal injection wells there is the concern that the capital outlay required to drill and test a prospective injection well carries with it considerable risk. For example, well control to the depth of injection is limited with an offset of about 10 miles. Also, sand thicknesses in the injection zone can vary, sometimes rarely meeting the thickness requirement for such wells. In some cases, the result is a dry hole with no injection sand penetrated. Those failures also add to the cost associated with brine disposal.

Moreover, dependence on injection wells for long range, dependable and environmentally sound disposal of brine is being questioned by federal land management agencies, local authorities, and producers. Federal, state and local regulations governing health, environmental protection, and water quality have also made existing disposal procedures more complex and costly.

In the case of existing injection wells, some of the concerns mentioned above are not as paramount since many of the construction costs have already been expended. However, in such situations, the disposal capacity of the injection well may limit the production of oil and gas. Such a situation may not be so uncommon given that a gas or oil well can result in 1,000 to 10,000 barrels of brine a day. If the injection well is not capable of disposing of that amount of brine, the production rate of the oil or gas well will be unnecessarily limited.

Thus, the availability of an environmentally and economically viable method to dispose of this brine is essential in the successful operation of gas and/or oil producing wells. In addition, an economic brine disposal method could extend oil and gas production, thereby adding to the oil and gas reserves that are recoverable.

SUMMARY OF THE INVENTION

The method according to the present invention provides methods for treating and disposing waste water such as brine resulting from the production of oil and/or gas wells. These methods are not as susceptible to the foregoing disadvantages and drawbacks.

In accordance with one aspect of the present invention, the method involves recovering brine during production of an oil and/or gas well, passing the recovered brine through a reverse osmosis unit to yield a first stream having a first salt concentration that is less than the salt concentration of the recovered brine and a second stream having a salt concentration that is greater than the salt concentration of the recovered brine, and passing the second stream through a combustion heat evaporator to yield a third stream as well as water vapor. The third stream, which has a salt concentration greater than the salt concentration of the second stream, is then mixed with a liquid to yield a brine mixture. Thereafter, the resulting brine mixture is injected into a subterranean formation. The mixing of the third stream with liquid to produce the injected brine mixture is carried out in such a way that the salt concentration of the resulting brine mixture is less than the maximum solubility of the salt in solution at temperatures encountered during the injecting step so that the salt remains in solution during the injecting step and after the brine mixture is in place in the subterranean formation. In that way, clogging of the subterranean formation can be avoided.

In a preferred embodiment, the recovered brine can be pretreated through the addition of anti-scalants in order to prevent fouling of the reverse osmosis unit and, to remove trace elements or chemicals, such as barium, strontium, or benzene that may affect the usability of the first stream for commercial or other usage. The first stream yielded from the reverse osmosis unit preferably has a salt concentration less than 500 ppm to produce a potable source of water that can be used commercially or disposed safely in the environment. The liquid with which the third stream from the combustion heat evaporator is mixed in order to yield the brine mixture that is injected into the subterranean formation can be bled from the original brine stream or from the pretreated brine stream. Additionally, the volumetric flow rates through the reverse osmosis unit and the combustion heat evaporator are preferably controlled to establish a steady-state operating condition.

In accordance with another aspect of the present invention, a method is provided for treating and disposing of brine that involves introducing the brine feedstream into a combustion heat evaporator to produce water vapor and a concentrated brine effluent having a salt concentration greater than the salt concentration of the brine feedstream. The concentrated brine effluent is extracted from the combustion heat evaporator and is mixed with liquid to produce a brine mixture having a salt concentration greater than the salt concentration of the brine feedstream. That brine mixture is then injected into a subterranean formation to dispose of the brine mixture. The brine mixture that is injected into the subterranean formation possesses a salt concentration which allows the salt or other impurities to remain in solution during and after injection into the subterranean formation.

In accordance with preferred embodiments of the present invention, the liquid with which the concentrated brine effluent is mixed can be brine from the brine feedstream that is introduced to the combustion heat evaporator. The combustion heat evaporator is preferably operated under steady-state operating conditions in order to establish a substantially constant salt concentration in the combustion heat evaporator.

In accordance with another aspect of the present invention, a method of treating brine that contains salt involves passing brine in the form of a brine feedstream having a salt concentration through a reverse osmosis unit to produce a first discharge stream of potable water whose salt concentration is less than the salt concentration of the brine and a second discharge stream whose salt concentration is greater than the salt concentration of the brine. The brine is preferably pretreated prior to being passed through the reverse osmosis unit in order to prevent fouling of the reverse osmosis unit. The second discharge stream flowing out of the reverse osmosis unit is then injected into a subterranean formation to dispose of the brine.

According to another aspect of the present invention, a method for treating brine that contains salt having an initial salt concentration, introducing a stream of said brine into a combustion heat evaporator at a controlled volumetric rate to evaporate water from the brine and thereby produce a concentrated brine solution whose salt concentration is greater than the initial salt concentration of the brine and extracting the concentrated brine solution from the combustion heat evaporator at a controlled volumetric rate to effect a steady-state operating condition in the combustion heat evaporator. The concentrated brine solution is then introduced into a drying unit which dries the concentrated brine solution to yield low moisture solid salt particles. The low moisture solid salt particles are then recovered from the drying unit so that they can be used commercially or disposed safely in a waste disposal site.

In accordance with a preferred embodiment of the method, the brine can be passed through a reverse osmosis unit prior to being introduced into the combustion heat evaporator in order to yield a potable water stream whose salt concentration is less than the initial salt concentration of the brine and a discharge brine stream whose salt concentration is greater than the initial salt concentration. Also, the brine can be pretreated prior to being introduced into the reverse osmosis unit through the addition of anti-scalants in order to control scaling associated with the presence of calcium carbonate and fouling of the reverse osmosis unit associated with the presence of sulfates. The drying unit in which the concentrated brine solution is dried can take the form of a pulse combustion dryer that produces water vapor in addition to the low moisture solid salt particles.

In each of the foregoing preferred embodiments of the present invention, and as used throughout the present specification and claims, where the term "combustion heat evaporator" is used, such evaporator will be shown and described in connection with reference to apparatus wherein combustion gases are directly generated within the an evaporator or are produced in an internal combustion engine or the like, and heat is then recovered from the exhaust gas, or from the engine coolant. Heat may be available from such an internal combustion engine, used to drive a compressor, a generator, or a pump, serving as a prime mover of processes which generate such brines.

As used herein, the term combustion heat evaporator is intended to define either a submerged combustion evaporator wherein gas and air are burned in a burner submerged in the liquid to be evaporated, or an evaporator in which brine is evaporated by waste heat in hot exhaust gases from an internal combustion engine, or from the heat from fluids serving as coolants for such an engine.

BRIEF DESCRIPTION OF THE DRAWING FIGURES

The foregoing steps associated with the method of the present invention will become more apparent from the detailed description set forth below considered in conjunction with the accompanying drawing figures in which like reference numerals designate like elements and wherein.

DETAILED DESCRIPTION OF THE PREFERRED EMBODIMENTS

Figure 1:
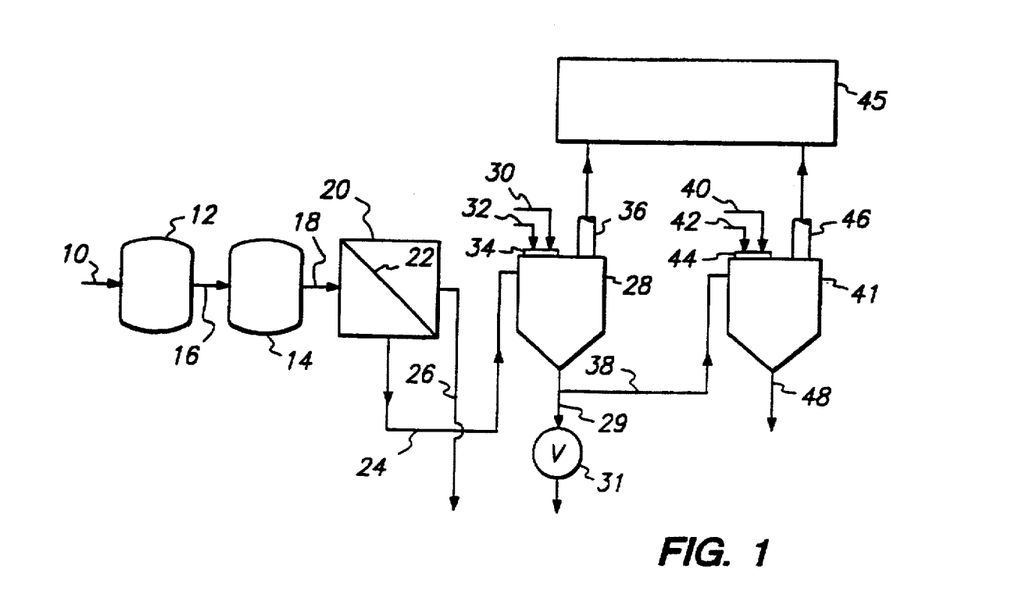
FIG. 1 is a schematic illustration of a method according to one embodiment of the present invention in which the combustion heat evaporator is a submerged combustion unit.

FIG. 1 schematically illustrates one embodiment of a method according to the present invention. A source of waste is provided for supplying a brine feedstream 10. A storage tank (not shown) can be provided to store the brine. In accordance with one application of the present invention, the source of feedstream 10 can be brine that has been recovered from the production of an oil and/or gas well. Brine recovered from such activity will serve as the basis for the following discussions of various treatment and disposal methods. However, it is to be understood that the methods described more fully below can also be used to treat and dispose of waste water and brine from other sources.

The waste water or brine feedstream 10 can be pumped through a series of pretreatment units 12, 14 which are designed to pretreat the brine. The discharge 18 from the pretreatment units is then pumped into a reverse osmosis unit 20 which contains one or more membranes 22. The pretreatment units 12, 14 through which the feedstream 10 is pumped are preferably designed to prevent fouling of the membrane(s) 22 in the reverse osmosis unit 20.

Fouling of the membrane(s) 22 in the reverse osmosis unit can decrease the salt rejection across the membrane(s) 22, thereby increasing the pressure drop required across the membrane. As a result, the productivity of the reverse osmosis unit is reduced. The pretreatment can include controlling the scaling due to calcium carbonate that may be present in the brine feedstream 10. Fouling by sulfates or other elements such as calcium, barium, and strontium sulfates can be controlled by adding anti-sealants to the brine stream. If the brine contains iron, all ferric iron may need to be removed from the feed water stream 10. If iron is in the soluble ferrous form, iron precipitation may not occur. However, if $Fe^{++}$ is oxidized to $Fe^{+++}$, an iron precipitate $Fe(OH)_3$ may be formed that may cause fouling. The feedstream may also contain colloids in the form of very small particles of sub-micron size. These colloids are electrically charged and are in suspension because they repel one another. Colloidal fouling of the membrane(s) 22 can be caused by coagulation of the colloids and deposition of the coagulated material on the membrane. Thus, the colloidal material needs to be filtered from the feedstream before the brine can be treated by the reverse osmosis process.

Pretreatment units which can address the foregoing concerns are known. Thus, details concerning the pretreatment units 12, 14 will not be set forth. Suffice it to say that the pretreatment units are designed to remove colloidal matter that might foul the membrane 22 of the reverse osmosis unit 20. Also, the pretreatment units 12, 14 can be designed to render harmless to the membrane 22 of the reverse osmosis unit 20 any salt or metal constituents present in the brine feedstream. Additionally pretreated units 12, 14 may remove trace elements or chemicals, such as barium, strontium, or benzene, that may affect the usability of the stream leaving the reverse osmosis unit for commercial or other usage. Further, although FIG. 1 illustrates two pretreatment units 12, 14, it is to be understood that more than two pretreatments could be employed if necessary or desired. On the other hand, a single pretreatment unit may be all that is necessary depending upon the composition of the brine feedstream 10. Indeed, in some situations, it may be possible to do away with the pretreatment units 12, 14 altogether. Depending upon the composition of the brine or waste water, it may also be necessary to employ filters, softeners or to employ chemical agents to help adjust the pH and thereby avoid excessive scaling in the reverse osmosis unit 20.

After pretreatment, the pretreated brine feedstream 18 is pumped into the reverse osmosis unit 20. The reverse osmosis unit 20 includes one or more membranes 22 that cause the brine stream 18 to be divided into two streams 24, 26. One of the streams 26 (i.e., a first discharge stream) possesses a lower salt concentration than the incoming brine feedstream 18 while the other stream 24 (i.e., a second discharge stream) possesses a salt concentration that is higher than the salt concentration of the incoming brine feedstream 18. Preferably, the membrane(s) 22 in the reverse osmosis unit 20 are designed to result in a salt concentration in the first discharge stream 26 that is low enough to meet the environmental and health requirements for enabling the fluid to be used, for example, for irrigation purposes.

Reverse osmosis units suitable for use in conjunction with the system and method of the present invention are known in the art and thus are not described in detail. Suffice it to say that such units typically consist of a pressure vessel in which are located one or more semi-permeable membranes. In the context of the present invention, the brine from the incoming brine feedstream 18 would flow under pressure past the semi-permeable membrane(s). The membrane(s) 22 can be tailored, by methods known in the art, to the specific brine to be treated so that most of the salt of the brine stays on the high-pressure side of the membrane(s) 22 while a solution with lower salt concentration passes through the membrane (s). In that way, the reverse osmosis unit separates the brine into the aforementioned two streams 24, 26— one of which has a salt concentration greater than the incoming brine feedstream 18 and the other of which has a salt concentration less than the incoming brine feedstream 18.

Preferably, the reverse osmosis unit 20 is designed to produce a first discharge stream of potable water having a salt concentration of less than 500 ppm. On the other hand, a reverse osmosis unit should preferably concentrate the brine so that the second discharge stream 24 possesses a salt concentration in the range of 20,000 ppm to 60,000 ppm, and possibly higher (e.g., 100,000 ppm). Also, multiple reverse osmosis units disposed in series could be employed to achieve even higher brine concentrations. It is, of course, recognized that increasing the salt concentration of the brine exiting the reverse osmosis unit(s) becomes increasingly more difficult, and thus more expensive, to achieve. The reverse osmosis unit 20 is preferably capable of reducing the brine volume of stream 18 by approximately 75% to achieve stream 24.

The second discharge stream 24 which comprises the concentrated brine is next introduced into a combustion heat evaporator, in the form of a submerged combustion evaporator 28. Submerged combustion evaporators are known in the art and thus, the details pertaining thereto will not be specifically discussed. However, generally speaking, in submerged combustion evaporation, a combustible mixture of air 30 and gas 32 is introduced to a combustion chamber 34, and is ignited. The gas 32 can take the form of coalbed methane. The combustion chamber 34 can be positioned above the liquid bath so that combustion takes place above the liquid while the combustion gases are discharged through the liquid. Alternatively, the submerged combustion evaporator 28 can be designed so that combustion takes place partially below the liquid surface. The intimate contact between the combustion gases and the liquid causes the liquid to be heated directly, stirred and partially evaporated.

The water vapor and combustion products of the submerged combustion evaporator 28 are discharged out of the evaporator through an exhaust stack 36. The water vapor and combustion products can be vented into the atmosphere.

During operation, brine is continuously fed at a controlled volumetric rate to the submerged combustion evaporator 28 from start-up through steady-state operation. During start-up of the submerged combustion evaporator 28, the salt concentration in the evaporator 28 increases because part of the water from the brine is evaporated, thereby leaving a solution of increased concentration in the evaporator 28. The solution concentration in the evaporator 28 increases from the concentration of the feedstream 24 to a predetermined operating concentration. After the operating brine concentration in the submerged combustion evaporator 28 is reached, part of the concentrated brine is bled from the evaporator 28 at a controlled volumetric rate while new brine 24 is continuously fed at a controlled volumetric rate to the evaporator 28. During steady-state operation of the submerged combustion evaporator 28, a constant salt concentration can be established. The salt concentration of the brine in the submerged combustion evaporator 28 can be higher than the maximum solubility of the salt at the operating temperature of the evaporator 28. In such a situation, the brine consists of a mixture of saturated brine solution and solid particles that are kept in suspension in the evaporator 28 due to the agitation of the brine by the combustion gases that are vented through the brine. In addition, a recirculation pump or stirrer (not shown) may be installed to stir the brine in the submerged combustion evaporator 28.

A typical concentration of the brine in the submerged combustion evaporator 28 during steady-state operation can range from 200,000 ppm to 400,000 ppm, or possibly higher. The concentrated brine 38 that is bled from the evaporator 28 should preferably be kept flowing in the various pipes to avoid deposition of solid particles on the components. In addition, precautions may need to be taken when the evaporator 28 is shut down because the suspended salt particles may deposit on system components when the agitation of the brine mixture ceases. Such precautionary measures can take the form of valves installed at appropriate places in the piping that permit drainage from the piping and the submerged combustion evaporator 28 upon shut down. Drainage valve 31 in drain line 29 may be manually operated or electrically controlled through a solenoid (not shown) to drain the submerged combustion evaporator 28 and line 38, or other piping when the combustion unit shuts down, or fails.

The further concentrated brine stream 38 that is discharged from the submerged combustion evaporator 28 usually consists of a solution of salts in water and a suspension of salt particles. At the concentrations indicated, the maximum solubility in water of the salts, such as sodium bicarbonate and sodium chloride, is usually exceeded. Thus, the further concentrated brine stream 38 that is extracted from the submerged combustion evaporator 28 can actually take the form of a salt mixture or a salt slurry.

The salt slurry 38 discharged from the submerged combustion evaporator 28 can then be pumped into a dryer unit 41 which is designed to evaporate water from the brine slurry 38. Various types of drying units are suitable for this purpose. One type of drying system that has been found to be useful involves spray drying in which the brine slurry 38 is sprayed into a hot gas steam. Spray drying affords a practical means for proceeding from a brine that is in solution or in a slurry state, to a substantially dry product of solid salt particles. Spray drying can consist of the introduction of a pumpable salt stream into a thermal environment tailored to the temperature sensitivity of the brine being dried. In this type of system, water is removed by evaporation. The surface area of the brine feedstream presented to the hot surroundings governs the evaporation rate and temperature-time history of the brine being processed. Conventional spray drying methods utilize a spray nozzle or rotary wheel to atomize the feedstream.

One particular type of spray dryer that can be particularly useful in the system of the present invention is a pulse combustion dryer. Due to their unique properties, these types of dryers are compact and potentially energy efficient. Such a dryer 41 is generally illustrated in FIG. 1. In a pulse combustion dryer 41, air 40 and gas 42 are mixed together and combusted in a combustion chamber 44. An arrangement such as a rotary valve is provided to cause high frequency pulsations in the combustion region. The high-intensity sonic pulsations atomize the brine slurry 38 in a pulsating jet of combustion gases. The water vapor from the brine slurry 38 along with the combustion products from the pulse combustion evaporator 41 can be vented into the atmosphere through an exhaust stack 46. Substantially dry salt particles having a moisture less than about 3% can be recovered in an area 48 below the pulse combustion dryer 41.

As illustrated in FIG. 1 and described above, the water vapor and combustion products resulting from operation of the submerged combustion evaporator 28 and the pulse combustion dryer 41 are vented to the atmosphere through appropriate stacks 36, 46. However, it may be useful in some contexts to condense the water vapor and to cool the combustion products in a heat exchanger 45 to recover a substantial amount of the heat in those gases. Condensation of the water vapor and cooling of gases will release heat that can be used, for example, to preheat the brine at various stages of the process, thereby reducing the overall energy requirements of the system. In cold environments where the equipment is located in an enclosed structure, the heat resulting from condensation and cooling could also be effectively used to warm the enclosed structure.

A method such as that described above and illustrated in FIG. 1 is quite useful and advantageous from several standpoints. First, the nature of the system and the equipment comprising the system affords flexibility so that the system can be tailored to site specific conditions. Moreover, the mobility of the equipment lends itself to relocation in order to meet changes in field operations. As a result, the system can service a number of wells restricted by topography, can reduce the gathering expense for brine collection pipelines, and can possibly eliminate the need to transport fluid to a central injection site.

The method illustrated in FIG. 1 is also useful in that it does away with the need for injection wells. Thus, the risk associated with drilling and testing prospective brine disposal injection wells, and the significant costs associated with producing such wells can be avoided.

The system is also quite attractive from the standpoint of being able to transform an entire source of brine into three components—potable water that can be used commercially or for irrigation purposes, combustion gases and water vapor that can be vented safely into the atmosphere (and possibly passed through a heat exchanger to satisfy a portion of the energy requirements of the system), and low moisture solid salt particles that can be either taken to a landfill or recycled for commercial use. Brines which contain sodium bicarbonate, for example, may be particularly attractive in this context given the highly useful nature of sodium bicarbonate byproducts in treating combustion process effluent streams.

Although the method described above and schematically illustrated in FIG. 1 provides a cost effective alternative to current brine disposal methods that utilize injection wells, situations may arise in which the disposal of brine in injection wells can still be accomplished. For example, in those areas where injection wells have already been installed, much less concern exists about the cost associated with installing such wells. That is because much of the installation cost has already been expended. Moreover, the risk normally associated with new injection well exploration is of no concern with existing wells. In those situations, it may be beneficial to continue disposing of the brine in the injection well.

Figure 3:
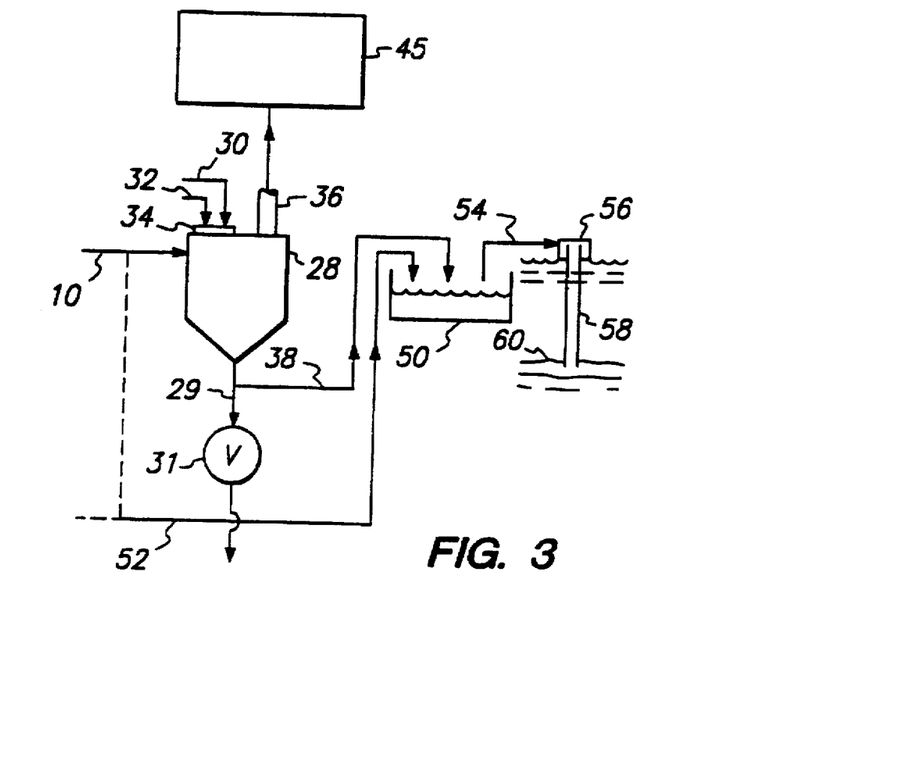
FIG. 3 is a schematic illustration of a method according to a third embodiment of the present invention; similar to FIG. 1
Figure 4:
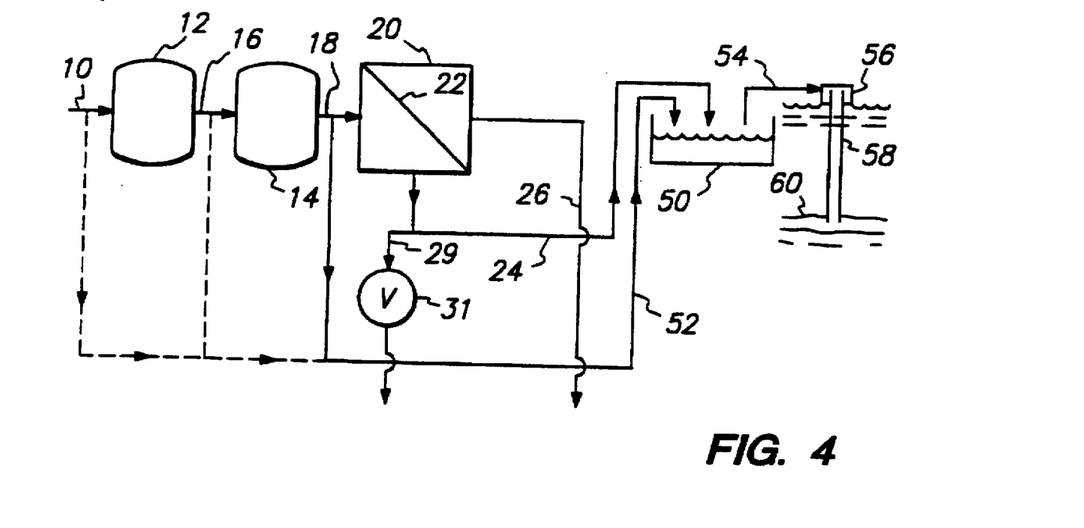
FIG. 4 is a schematic illustration of a method according to a fourth embodiment of the present invention.

However, the brine disposal capacity of existing injection wells may serve as an impediment to full productive operation of the oil or gas well. That is, if the amount of brine produced on a daily basis from an oil or gas well exceeds the brine disposal capacity of the injection well, oil or gas production will most likely have to be reduced to meet the operating level of the injection well. Thus, it would be quite useful to implement a more economical brine disposal method. In that way, oil and gas production could be extended, thereby potentially increasing the recoverable oil and gas reserves. In addition, more economical use of existing injection wells could alleviate the need for new injection wells. The systems and methods schematically illustrated in FIGS. 2-4 represent ways of achieving such objectives.

Figure 2:
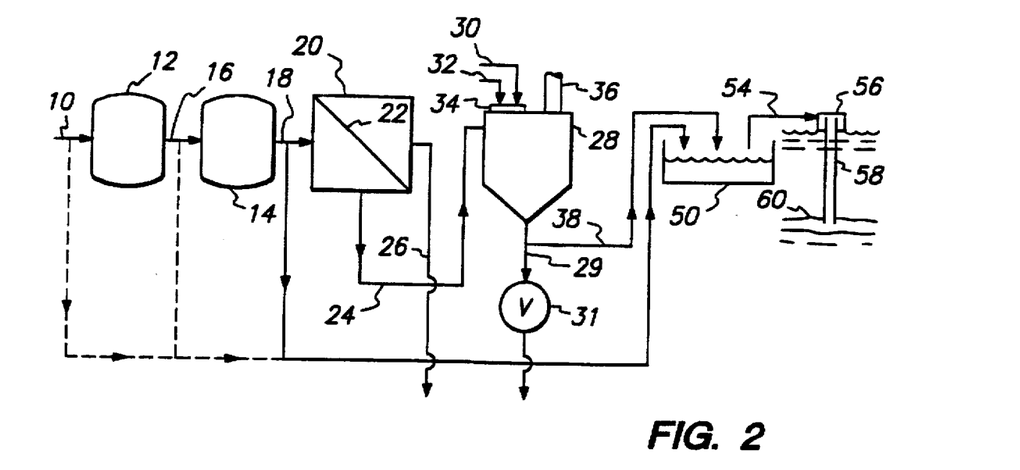
FIG. 2 is a schematic representation of a method according to a second embodiment of the present invention, similar to FIG. 1.

Turning first to FIG. 2, in which elements similar to those illustrated in FIG. 1 are designated with like reference numerals, a brine feedstream 10 can be pumped into one or more pretreatment units 12, 14. As noted above with respect to the system depicted in FIG. 1, the pretreatment units 12, 14 can be eliminated all together if the composition of the brine does not necessitate that it be pretreated prior to entering the reverse osmosis unit 20. The brine feedstream 18 is then introduced into the reverse osmosis unit 20 where it flows under pressure past semi-permeable membrane(s) 22. The membrane(s) 22 can be optimized to the particular characteristics of the brine being treated. The pressure gradient across the membrane(s) 22 causes water to flow through the membrane(s), while most of the salt stays behind. As a result, two streams emerge from the reverse osmosis unit 20, one of which flows through line 26, consists of a stream of lower salt content than the feedstream, and preferably having a salt content sufficiently low that the stream from line 26 becomes a potable stream. The other stream flowing in line 24 consists of brine having a salt concentration greater than the salt concentration of the original feed brine in line 18. The salt concentration in the potable water stream 26 is preferably low enough so that the water can be safely used for irrigation or discharged into the local drainage system. The reverse osmosis unit 20 is preferably capable of reducing the brine volume of stream 18 by approximately 75% to achieve stream 24.

The concentrated brine stream 24 is then introduced into the submerged combustion chamber 28 which produces a further concentrated brine stream 38, as well as combustion gases and water vapor that are vented through an exhaust stack 36. The concentrated brine stream or brine slurry 38 from the submerged combustion evaporator 28 is then pumped into a mixing tank 50 where it is mixed with other liquid. In the preferred embodiment, the liquid with which the concentrated brine slurry 38 is mixed includes brine that has been bled from the original brine feedstream 10. As also illustrated in FIG. 2, brine line 52 with which the concentrated brine slurry in line 38 is mixed can also be derived from either or both pretreatment units 12, 14 as through pretreated brine streams in lines 16 or 18 located upstream of the reverse osmosis unit 20. Alternatively, the concentrated brine slurry from line 38 can be mixed with fresh water or possibly a combination of fresh water and brine from the original feedstream 10. In any event, the liquid with which the brine slurry is mixed has a lower salt concentration than the brine slurry 38.

The brine mixture 54 from the mixing tank 50 is then pumped into an injection well 56, through the well bore 58 and into the subterranean formation 60. By mixing the brine slurry 38 with brine or other liquid whose salt concentration is less than that of the brine slurry 38, it is possible to produce a brine mixture 54 having a salt concentration which guarantees that salt will not come out of solution during the injection process or after the brine is injected into a subterranean formation, such as 60. When the brine slurry is mixed with brine 52 that has been bled from one or more of the brine feedstreams 10, 16, 18, the amount of brine 52 is computed based upon the salt concentration and volume of the brine mixture stream 54 so that the brine mixture 54 possesses a salt concentration well below the maximum solubility of the salt in solution at the temperatures encountered in the mixing tank 50 and during the injection process. Thus, the brine mixture 54 that is pumped into the injection well 56, through the well bore 58 and into the subterranean mixture 60 possesses a salt concentration that inhibits plugging of the formation 60 at the temperature and pressure of that formation 60.

The system and method schematically shown in FIG. 2 extend the disposal capacity of injection wells, thereby providing a more economical use of injection wells. The original brine feedstream 10 is reduced in volume by a significant amount so that the total volume of brine that is injected into the injection well 56 through the well bore 58 and into the subterranean formation 60 represents only a small fraction of the initial volume of brine. Since the amount of brine that is injected into the injection well relative to the original brine is reduced, oil and gas production can be extended, thereby adding to the oil and gas reserves that are recoverable.

Each of the various parts of the systems illustrated in FIGS. 1 and 2 have an optimum range of operation. The submerged combustion evaporator 28 can concentrate a brine feedstream to the maximum solubility of the brine salts in an aqueous solution at the operating temperature of the evaporator, which may be in the range from about 170° F. to about 190° F. for a feedstream containing sodium bicarbonate brines. However, in the case of many brines, the submerged combustion evaporator 28 can concentrate the brine to two or three times the maximum solubility. In this latter case, the evaporator contains a mixture of a salt solution and a suspension of solid particles. In the case of many brines, the solid particles are kept in suspension because of the agitation of the brine mixture by the venting of the combustion gases through the brine. Also, the solid particles can be kept in suspension by agitation induced, for example by a recirculating pump (not shown) that recirculates the brine mixture in the evaporator 28.

To exemplify, a brine consisting of sodium bicarbonate may have a saturation concentration of approximately 164,000 ppm at a temperature of 140° F. However, when other salts, such as sodium chloride, are present in the solution, the solubility of the sodium bicarbonate decreases. This type of brine can be concentrated to two or three times the saturation concentration because the salt particles of these salts remain in suspension as long as the evaporator is operating.

The salt concentration of the brine mixture in the submerged combustion evaporator 28 may range from 100,000 to 400,0000 ppm, although concentrations of 550,000 ppm are feasible with some brines. The brine feedstream 10 to be processed may have a salt concentration that ranges from a low of 500 ppm to concentrations that are ten or more times that amount. If the concentrated brine from a reverse osmosis unit were fed to the submerged combustion evaporator, the concentration of the feedstream to the submerged combustion evaporator could have concentrations that range from 5,000 to 50,000 ppm or greater. If the feedstream 24 from the reverse osmosis unit 20 to the submerged combustion evaporator 28 were to have a concentration of 50,000 ppm, and the submerged combustion evaporator 28 were operated at a steady-state concentration of 300,000 ppm, the brine volume would be decreased by a factor of six through operation of the submerged combustion evaporator 28.

As an example of suitable operating parameters for the system illustrated in FIG. 1, the reverse osmosis unit 20 can be designed to effectively handle on a daily basis 5,000 barrels of brine 10 whose salt concentration is 7,000 ppm (i.e., 0.7% solution). The reverse osmosis unit 20 could then deliver 3,750 barrels of potable water 26 having a salt concentration of 400 ppm (and possibly less if required by local regulations), and 1,250 barrels of brine 24 whose salt concentration is about 26,800 ppm. Thus, the treatment of the brine in the reverse osmosis unit 20 would reduce the brine volume by 75%. The brine from the reverse osmosis unit 20 would then be continuously fed to the submerged combustion evaporator 28. Concentrated brine 38 would be bled from the submerged combustion evaporator 28 at a controlled rate so that a steady-state brine concentration is established in the evaporator 28. When provided on a daily basis with 1,250 barrels of brine having a salt concentration of 26,800 ppm, the submerged combustion evaporator 28 would evaporate water from the brine slurry 38 so that a steady-state concentration of 250,000 ppm is developed in the submerged combustion evaporator 28. The brine slurry 38 can then be recovered from the submerged combustion evaporator 28 under computer control so that the brine feed rate is balanced with the brine evaporation rate, thereby resulting in a steady-state operation. The discharged brine slurry 38 would have a volume of about 134 barrels a day. Thus, at this stage of the process, the initial daily brine volume of 5,000 barrels a day will have been reduced by more than 97%.

The concentrated brine in the submerged combustion evaporator 28 would possess a temperature of about 175° F., and consist of a saturated solution and a suspension of a salt particles. This is so because the saturation solution of a brine consisting of sodium bicarbonate and 1,000 ppm of sodium chloride has a solubility of about 140,000 ppm at 140° F. The salt particles would be kept in suspension in the submerged combustion evaporator 28 due to the agitation of the brine by the combustion products that are vented through the brine, and possibly the action of a recirculation pump. At that point, the brine slurry 38 would be introduced into the drying unit 41 where it is dried, thereby resulting in low moisture solid salt particles.

On the other hand, in the situation where an injection well is available for injecting the brine solution, the concentrated brine slurry 38 consisting of 134 barrels a day can be mixed in the mixing tank 50 with approximately 365 barrels a day of brine that has been bled from the brine feedstream 10. The resulting brine mixture 54 would then be injected into the injection well 56, through the well bore 58 and into the subterranean formation 60. Thus, the initial brine volume of 5,000 barrels a day would be reduced to approximately 500 barrels a day (i.e., a volume reduction of approximately 90%). Reducing the injection requirements of an injection well to such an extent can significantly extend the life of an existing injection well. Additionally, it may entirely do away with the need for a new injection well.

Depending upon the specific conditions of the waste water or brine 10 that is to be treated, the volume of the waste water or brine to be treated, and the local field conditions, it may be economically more beneficial to operate less than all of the pieces of equipment illustrated in the systems shown in FIGS. 1 and 2. For example, as illustrated in FIG. 3, it may only be necessary to employ the submerged combustion evaporator 28 into which the brine feedstream in line 10 is introduced. The brine slurry in effluent line 38 that is extracted from the submerged combustion evaporator 28 can then be introduced into the mixing tank 50. Depending upon the salt concentration of the brine slurry in line 38, it may be possible to directly inject the brine slurry in 38 into injection well 56, without the need for mixing. However, when the concentration level of the brine slurry in line 38 is such that salt might come out of solution during the injection process, thereby creating the potential that the subterranean formation will be plugged, it may be useful to mix the concentrated brine slurry in line 38 in mixing tank 50 with other liquid to reduce the salt concentration. The arrangement of FIG. 3, as in the case of the system illustrated in FIG. 2, liquid, with which the brine slurry from line 38 may be mixed in tank 50, can constitute brine from line 52 that is bled from the original brine feedstream 10. Of course, fresh water could also be employed if desired. The concentrated brine slurry is preferably diluted to the extent necessary to produce a brine mixture in line 54 whose salt concentration allows the brine mixture to be injected into the injection well 56 without plugging the subterranean formation 60.

By way of example, assume 1,000 barrels of brine having a salt concentration of 5,000 ppm is produced in a well over a one-day period. The submerged combustion evaporator 28 can be designed such that the 1,000 barrels of brine are reduced to 25 barrels having a salt concentration of 200,000 ppm. Those 25 barrels could then be blended with 50 barrels of the brine from the brine feedstream 10 whose concentration is 5,000 ppm, thereby resulting in a brine mixture of 75 barrels having a concentration of 70,000 ppm. Depending upon the specific types of salts in the brine mixture, such a brine mixture could most likely be injected into the injection well without producing plugging of the subterranean formation. Thus, 1,050 barrels of brine fluid would be reduced to 75 barrels, thereby achieving a 92.9% reduction in volume.

As mentioned above, if gas or oil production were limited as a result of the brine disposal capacity of the injection well, implementing a method similar to that illustrated in FIG. 3 could result in a significant increase in gas or oil production.

As discussed in connection with the system shown in FIG. 1, the water vapor and combustion products which result from the operation of the submerged combustion evaporator 28 can be cooled in heat exchanger 45 to recover a substantial amount of the heat in those gases.

In accordance with another embodiment of the present invention illustrated in FIG. 4, brine in the form of a brine feed stream 10 can be introduced to a reverse osmosis unit 20 similar to the one discussed above in connection with the embodiment illustrated in FIG. 1. The brine flows into the reverse osmosis unit 20 under pressure and the pressure gradient across the membrane(s) 22 causes water to flow through the membrane. At the same time, the majority of the salt is prevented from passing through the membrane(s) 22. Thus, a potable water stream 26 having a relatively low salt concentration (e.g., less than 500 ppm) is discharged from the reverse osmosis unit 20 where it can be used commercially or disposed in the local drainage system. Also discharged from the reverse osmosis unit 20 is a concentrated brine stream 24 having a salt concentration greater than the salt concentration of the incoming brine 18. The reverse osmosis unit 20 is preferably capable of reducing the brine volume of stream 18 by approximately 75% to yield stream 24.

Before entering the reverse osmosis unit 20, the brine stream 10 can be passed through one or more pre-treatment units 12, 14 to pretreat and adjust the pH of the brine, thereby avoiding excessive scaling in the reverse osmosis unit 20. Also, as in the case of the other embodiments discussed above, the brine can be pumped through a filter assembly (not shown) and a softener (not shown) prior to entering the reverse osmosis unit 20.

Typically, the salt concentration of the concentrated brine stream in line 24 is not so high as to cause the salt to come out of solution during injection into injection well 56. Thus, in those situations, the concentrated brine stream in line 24 can be injected directly into the injection well 56 from the reverse osmosis unit 20. However, in the event the salt concentration in the concentrated brine stream of line 24 would cause salt to come out of solution during the injection process, the concentrated brine stream in line 24 can be pumped to a mixing tank 50 prior to being injected into the injection well. FIG. 4 also shows, as in the case of the systems illustrated in FIGS. 2 and 3, that the concentrated brine stream in line 24 can be mixed with brine from the original brine feedstream 10 to thereby produce a brine mixture in line 54 whose salt concentration ensures that salt will not come out of solution during the injection process. In that way, plugging of the subterranean formation 60 can be avoided.

Figure 5:
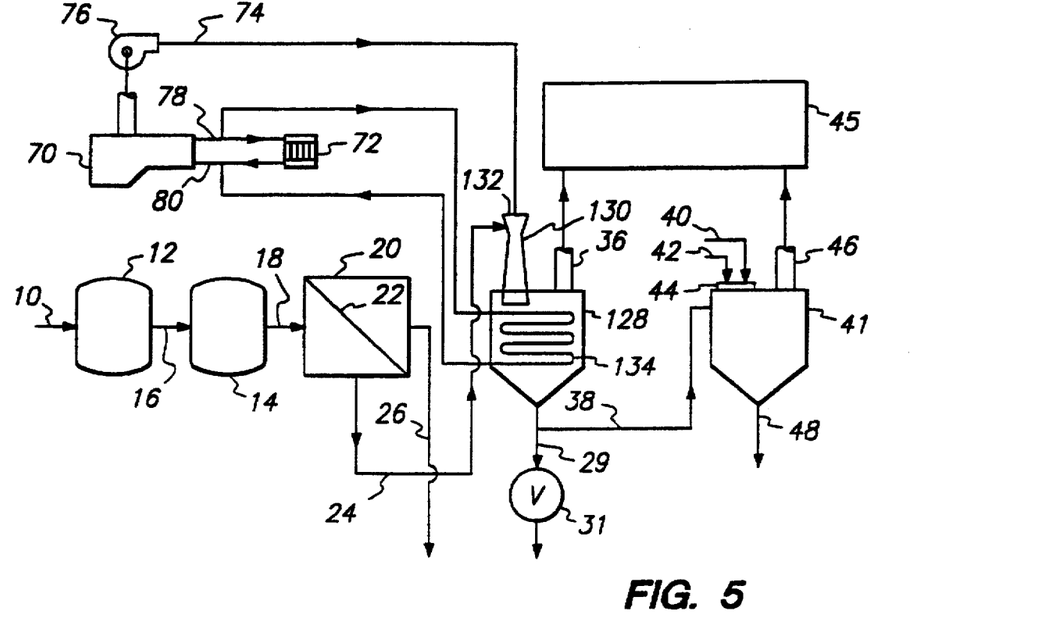
FIG. 5 is a schematic illustration of a method according to the present invention in which the combustion heat evaporator is powered by waste heat of combustion derived from exhaust gases of fuel and air in an internal combustion engine and/or from engine coolants for such an engine.
Figure 6:
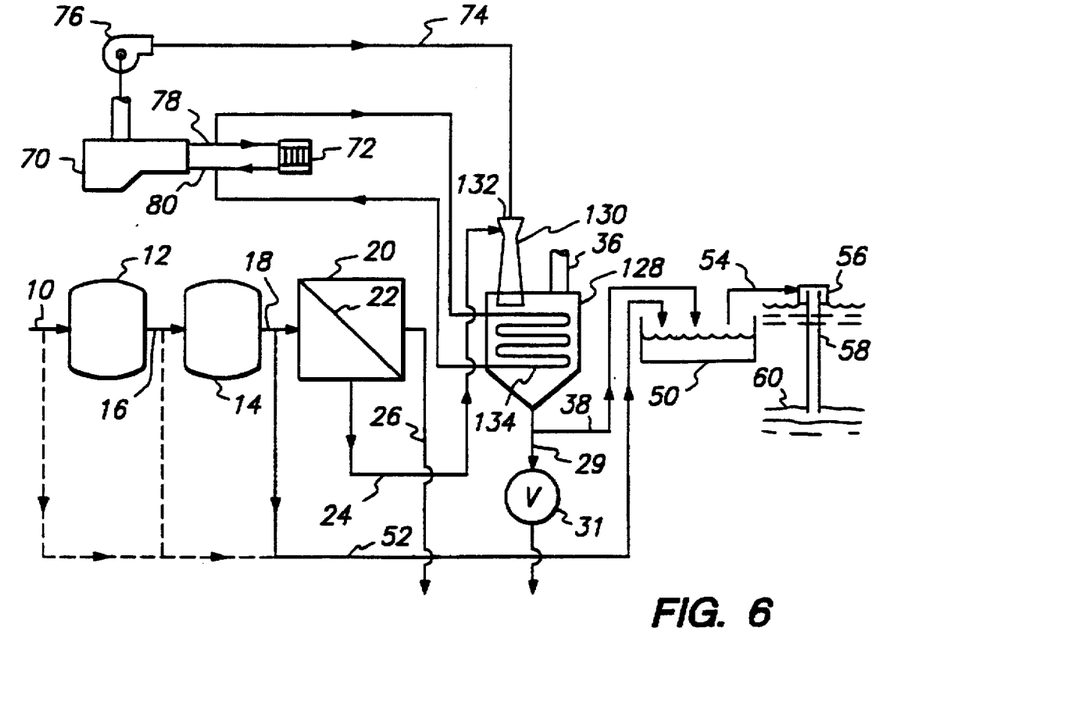
FIG. 6 is a schematic illustration of a method according to the present invention/similar to FIG. 5 in which a further embodiment utilizes waste heat to evaporate the brine in a combustion heat evaporator.
Figure 7:
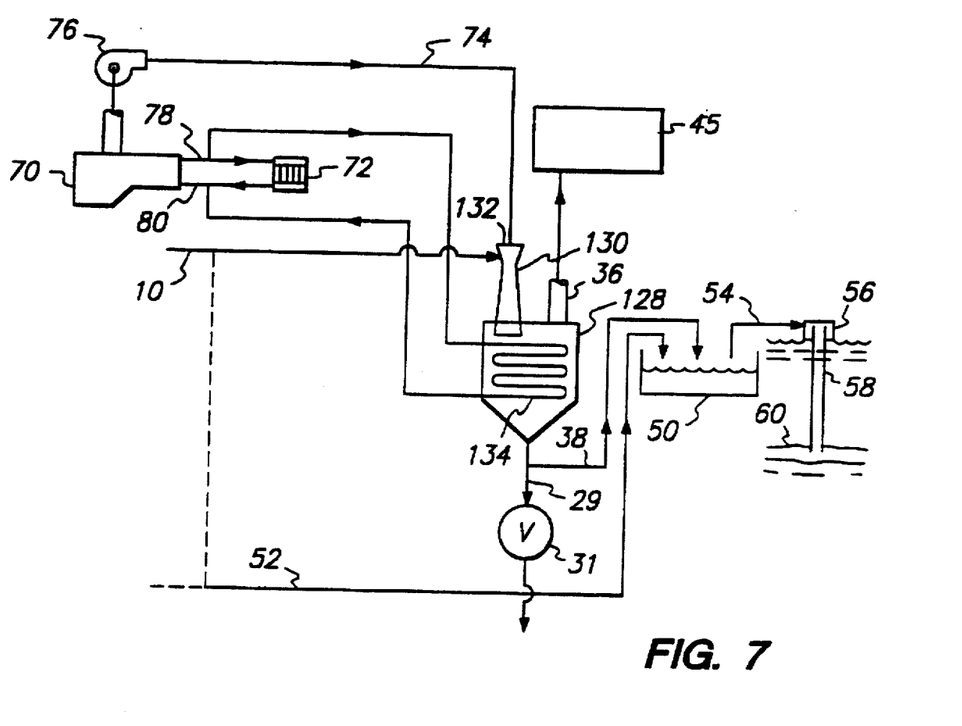
FIG. 7 is a further embodiment of the present invention also similar to the arrangements of FIGS. 5 and 6 in which the combustion heat evaporator is heated by waste heat from an internal combustion engine.

As indicated above, the arrangements of FIGS. 5 to 7 particularly illustrate arrangements similar to FIGS. 1 to 3, respectively. However, in FIGS. 5 to 7, the combustion heat evaporator is in the form of a waste heat evaporator. Generally speaking, as shown in each of FIGS. 5, 6 and 7, in such a waste heat evaporation, hot exhaust gases 74 from an internal combustion engine 70, or other apparatus of combustion, are delivered to a blower 76 to increase the pressure of the hot exhaust gas stream 74 so that these gases can be delivered to a venturi 130 that is installed above the liquid level of the brine mixture in the waste heat evaporator 128.

The difference between the temperature of the exhaust gases 74 and the temperature of the brine in waste heat evaporator 128 depends on the particular configuration of the units deployed and on the particular operating conditions. Typically, the exhaust gases 74 may have a temperature of about 425° C. (797° F.) above the temperature of the brine in the evaporator 128.

In a typical gas field operation, gas produced from the wells may need to be fed into a gas pipeline distribution system. To accomplish this, the gas is compressed by compressors to increase the gas pressure so that the gas can flow through a pipeline system that may extend over tens, and indeed, over hundreds of miles in length. These compressors may be driven by internal combustion engines 70 that use the gas from the gas field as a fuel. The exhaust gases from these engines 70 can be used to provide the heat to evaporate the water from the brine in waste heat evaporator 128. The waste heat evaporator receives its name from the fact that usually the exhaust gases 74 from the internal combustion engines 70 are vented into the atmosphere and therefore the heat in these gases is wasted.

The heat available in the exhaust gases from such an evaporation process is significant. The heat is about one-third of the energy available in the gas that is used to drive the engines. In the San Juan Basin in Colorado, a typical coalbed gas gathering system may have gas-driven internal combustion engines with a combined output of 45,000 KW (60,350 hp) to drive the compressors. The energy in these exhaust gases is about equal to the mechanical output of the internal combustion engines.

The concentrated brine stream 24 is pumped through ports installed upstream of the throat section 132 of the venturi 130. The intimate mixing action of the hot exhaust gases 74 and the brine from stream 24 causes a portion of the brine to be evaporated. The water vapor from the evaporated brine and the cooled-down exhaust waste gases either flow through an exhaust stack 36 into the atmosphere, or flow through a heat exchanger 45 to recover part of the heat in these gases. That portion of the brine which is not evaporated while flowing through the venturi 130 mixes with the brine in the waste heat evaporator 128. A recirculation pump (not shown) keeps the concentrated brine mixture stirred in the waste heat evaporator 128. At steady-state operation, the brine mixture in the waste heat evaporator 128 consists of a concentrated solution and solid particles that remain suspended by the action of the recirculation pump.

The recirculation pump also may deliver part of the concentrated brine mixture of evaporator 128 at a controlled rate to the brine feed stream 24 to venturi 130. Thus, the brine that is fed into venturi 130 may consist of both brine delivered to evaporator unit 128 as well as recirculated brine. Furthermore, some of the brine mixture of evaporator 128 is bled from the evaporator at a controlled rate to form stream 38. By controlling the brine feed rate to evaporator 128, the recirculation rate of the brine to venturi 130 and brine stream 38 bled from evaporator 128, a steady-state brine concentration condition can be established in waste heat evaporator 128 during evaporation of the water vapor from the brine that depends on the type of salts and on the salt concentration of the brine in evaporator 128. A typical temperature of the brine mixture during evaporation is 80° C. (175° F.) or higher.

The amount of heat rejected by internal combustion engine 70 to the engine coolant is also significant. In a typical internal combustion engine 70, the engine is cooled by engine coolant that is circulated through a radiator 72 by a coolant streams 78 and 80. The radiator in turn may be cooled by ambient air that is blown over the coils of radiator 72. In this case, the heat rejected by engine 70 to the engine coolant is transferred to the atmosphere and therefore is wasted for useful purposes.

Instead of wasting the heat of the engine coolant to the atmosphere, a heat exchanger 134 can be installed in waste-heat evaporator 128 to recover part of the heat rejected by the engine to the coolant and to use this heat in the brine evaporation process.

Valves (not shown) in the recirculation lines 78 and 80 can either permit circulation of the engine coolant through radiator 72 during operation of the engine without engine coolant heat recovery, or through heat exchanger 134 that is installed in evaporator 128. The stirring action of the brine in the evaporator is a result of the action of a recirculation pump or stirrer (not shown). This stirring action enhances flow of brine across the outside of the heat exchanger surfaces thereby enhancing heat transfer from engine coolant steam to the brine in the evaporator 128.

In all other respects, operations of the embodiments of the present invention as shown in FIGS. 5, 6 and 7 are substantially the same as those set forth above as to structures and their methods of operation in FIGS. 1, 2 and 3 respectively, except as to the source of combustion heat to power the combustion heat evaporators.

The principles, preferred embodiments and modes of operation of the present invention have been described above, but the invention which is intended to be protected should not be construed as limited to the particular systems and methods described, as they are merely intended to be illustrative rather than restrictive. Variations and changes may be made by others, and equivalents employed, without departing from the spirit of the present invention as set forth in the claims. Accordingly, the foregoing detailed description should be considered exemplary in nature and not limited to the scope and spirit of the invention as set forth in the appended claims.

What is claimed is:

1. A method for treating and disposing of brine resulting from the production of oil and/or gas, comprising:

recovering brine during production of oil and/or gas, the recovered brine having a salt concentration greater than 500 parts per million (ppm) so that said recovered brine is unsuitable for surface disposal;

passing said recovered brine through a reverse osmosis unit to yield a first liquid stream having a salt concentration that is not in excess of 500 ppm and a second liquid stream having a salt concentration is greater than the salt concentration of the recovered brine;

passing said second liquid stream through a combustion heat evaporator to yield a heated third liquid stream and water vapor, said third liquid stream having a salt concentration that is greater than the salt concentration of said second liquid stream and said water vapor resulting by evaporation of water from said second liquid stream in said evaporator being vented to atmosphere or condensed;

mixing said heated third liquid stream with a liquid to yield a heated fourth liquid stream having a salt concentration (1) greater than said recovered brine and (2) less than saturation at temperature and pressure conditions existing in an underground reservoir formation for disposal of said heated fourth liquid stream; and injecting said heated fourth liquid stream into said underground reservoir formation while maintaining the salt concentration of said fourth liquid stream at less than saturation at said temperature and pressure of said underground reservoir formation to prevent plugging of said underground reservoir formation during and after injection of the fourth liquid stream into said underground reservoir formation.

2. The method according to claim 1, wherein said recovered brine is pretreated by at least one of the steps comprising (1) adjusting the pH of said brine;
(2) passing said brine through a filter;
(3) adding a softener to said brine; and
(4) precipitating calcium carbonate before being introduced into said reverse osmosis unit in order to prevent fouling of the reverse osmosis unit.

3. The method according to claim 2, in which said mixing step includes mixing a portion of said pretreated brine with said third stream to produce said fourth liquid stream for injection into said underground reservoir formation through an injection well.

4. The method according to claim 1 wherein the recovered brine is pretreated before passing to said reverse osmosis unit to remove trace elements and chemicals from said recovered brine to result in said first stream from said reverse osmosis unit generating a water stream having less than 500 ppm of dissolved salts and suitable for potable, agricultural or commercial consumption.

5. The method according to claim 1, including a step of pretreating the recovered brine before passing the recovered brine to said reverse osmosis unit, said pretreating step including adding softening and/or anti-scalant material in an amount to control scaling associated with the presence of metal carbonates, and/or metal sulfates, and/or metal oxides in the recovered brine and to control fouling of said reverse osmosis unit associated with the presence of metal carbonates, and/or metal sulfates, and/or metal oxides in said recovered brine.

6. The method according to claim 1, which includes condensing the water vapor produced from said combustion heat evaporator and additionally includes recovering at least part of the heat of said water vapor.

7. The method according to claim 1, including controlling volumetric flow rates of said recovered brine through said reverse osmosis unit to regulate flow of said second stream passing into said combustion heat evaporator to establish steady-state operating conditions in said reverse osmosis unit and said combustion heat evaporator.

8. The method according to claim 1, wherein the volume of recovered brine after passing through said reverse osmosis unit and said combustion heat evaporator is reduced by at least 50%.

9. The method according to claim 1 wherein said combustion heat evaporator is a submerged combustion evaporator.

10. The method according to claim 1 wherein said combustion heat evaporator is a waste heat evaporator.

11. A method for treating and disposing of waste water that includes salt, comprising:

providing waste water in the form of a waste water feedstream having a salt concentration in excess of 500 ppm and which is unsuitable for direct disposal or storage above ground, introducing said waste water feedstream into a combustion heat evaporator to produce water vapor and a hot concentrated brine effluent having a salt concentration substantially greater than the salt concentration of said brine feedstream;

discharging the water vapor from said combustion heat evaporator and extracting the hot concentrated brine effluent from said combustion heat evaporator;

mixing said hot concentrated brine effluent with a liquid to produce a hot brine mixture having a salt concentration greater than the salt concentration of said waste water feedstream but less than said hot concentrated brine effluent;

flowing said hot brine mixture to an injection well bore penetrating a reservoir formation substantially below a potable water zone thereabove; and maintaining said hot brine mixture below a predetermined salt concentration during the flowing of said hot brine mixture to said injection well bore to avoid plugging the reservoir formation during and after the flowing of the brine mixture to the injection well bore.

12. The method according to claim 11 wherein said combustion heat evaporator is a submerged combustion evaporator.

13. The method according to claim 11 wherein said combustion heat evaporator is a waste heat evaporator.

14. The method according to claim 11, wherein the liquid in said step of mixing includes a portion of said waste water feedstream.

15. The method according to claim 11, wherein the volume of waste water after passing through said combustion heat evaporator is reduced by at least 50%.

16. The method according to claim 11, including establishing a steady-state operating condition in the combustion heat evaporator to achieve a substantially constant salt concentration in the brine effluent from said combustion heat evaporator.

17. The method according to claim 11, wherein said water vapor produced in said combustion heat evaporator is condensed to recover at least part of the water in said vapor and at least part of the heat of the combustion gases before release to the atmosphere.

18. A method of treating brine containing a salt solution, comprising:

introducing brine in the form of a brine feedstream having a salt concentration in excess of 500 ppm into a reverse osmosis unit;

passing said brine feedstream through a reverse osmosis unit at a rate to produce a first discharge stream of potable water whose salt concentration is less than 500 ppm and to provide a second discharge stream whose initial salt concentration is substantially greater than the salt concentration of said brine feedstream;

pretreating said brine feedstream prior to passing said brine feedstream through said reverse osmosis unit in order to prevent fouling of the reverse osmosis unit, said pretreatment of said brine feedstream including at least one step comprising (1) adjusting the pH of said feedstream; (2) passing said brine through a filter; and (3) adding softeners and anti-scalants to said feedstream, and combinations thereof, adjusting the salt content of said second discharge stream in accordance with at least the permeability, lithology and fluid content of a permeable subterranean formation that is substantially below the depth of potable ground water to prevent plugging of the permeable subterranean formation during and after injection into said permeable subterranean formation; and injecting said second discharge stream into said permeable subterranean formation.

19. The method according to claim 18, wherein after said second discharge stream is introduced into a combustion heat evaporator which produces an exhaust that includes water vapor, and including condensing at least part of the water vapor of the exhaust from said combustion heat evaporator to yield a condensate of another potable water stream having a salt content of less than 500 ppm and to generate a third discharge brine stream whose salt concentration is substantially greater than said initial salt concentration of said second discharge stream.

20. The method according to claim 19, wherein said third discharge brine stream flows to drying means which includes a combustion heat dryer for spraying of said third discharge brine stream against a heated flash surface to produce water vapor and low moisture solid salt particles.

21. The method according to claim 20, which further includes condensing the water vapor from said combustion heat dryer and recovering at least a part of the heat of exhaust gases of said combustion heat evaporator to generate a substantially salt and chemically free water stream.

22. The method according to claim 18, including pretreating said brine feedstream prior to being introduced into said reverse osmosis unit, said pretreating including adding softening and/or anti-scalant materials in order to control fouling and scaling of said reverse osmosis unit associated with the presence of metal carbonates, and/or metal sulfates, and/or metal oxides or other salts and chemicals in said brine feedstream and to remove elements and chemicals therefrom to produce the potable first discharge stream from said reverse osmosis unit.

* * * * *